No. 709,619. Patented Sept. 23, 1902.
J. G. WANGERIN.
IMPLEMENT SEAT.
(Application filed Mar. 25, 1902.)

(No Model.) 2 Sheets—Sheet 1.

Witnesses,
J. C. Duvall.
R. E. Randle.

Inventor,
JOHN G. WANGERIN;
by his attorney,
Robert W. Randle.

No. 709,619. Patented Sept. 23, 1902.
J. G. WANGERIN.
IMPLEMENT SEAT.
(Application filed Mar. 25, 1902.)
(No Model.)
2 Sheets—Sheet 2.

Witnesses,
J. C. Duvall.
R. E. Randle.

Inventor,
JOHN G. WANGERIN;
by his attorney,
Robert W. Candle.

UNITED STATES PATENT OFFICE.

JOHN G. WANGERIN, OF SPRINGFIELD, MINNESOTA.

IMPLEMENT-SEAT.

SPECIFICATION forming part of Letters Patent No. 709,619, dated September 23, 1902.

Application filed March 25, 1902. Serial No. 99,981. (No model.)

*To all whom it may concern:*

Be it known that I, JOHN G. WANGERIN, a citizen of the United States, residing at Springfield, in the county of Brown and State of Minnesota, have invented new and useful Improvements in Implement-Seats, of which the following is a specification which is sufficiently clear and concise as to enable others skilled in the art to which it appertains to make and use the same.

My invention consists in the parts, arrangement, shape, configurations, and combinations thereof, substantially as herein shown and described, and particularly pointed out in the appended claims terminating this specification.

The object of my present invention is the provision of a mechanism for hingedly mounting implement-seats to the supporting-standard thereof, whereby the seat may be placed laterally or perpendicularly at the will of the operator without the necessity of removing any of the parts or fasteners.

Another object is the provision of an implement-seat which can be quickly and easily secured to various kinds of implements and when so secured is adapted to be changed to a plurality of positions without disconnecting any of its parts, and still another object is the provision of a new article of manufacture in a vehicle-seat in combination with its securing and hinged mechanism, neat and attractive in appearance, and which can be manufactured and sold at a comparatively low price.

Other objects and advantages will appear from the following specification and from the drawings forming a part thereof, as fully shown and described hereinafter.

The details of the invention and the manner of operation will now be fully set forth, and the novel features will be recited in the appended claim.

Figure 1:
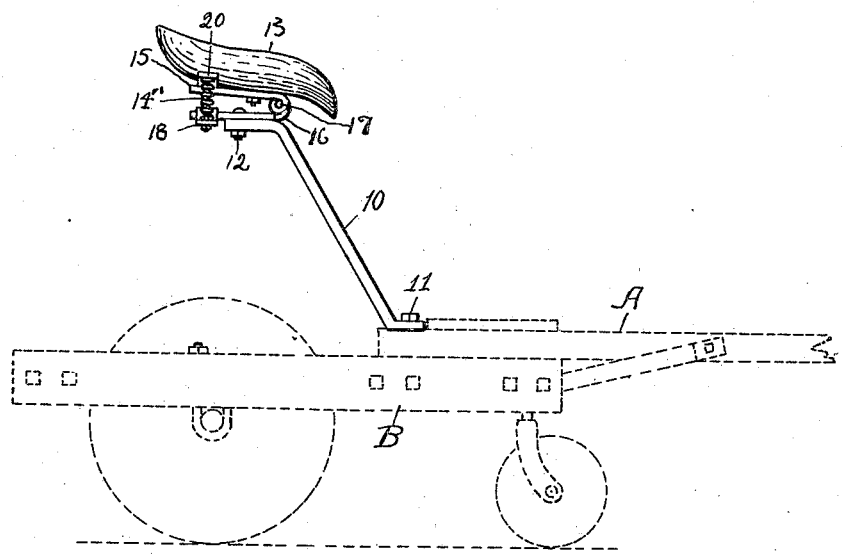
Figure 2:
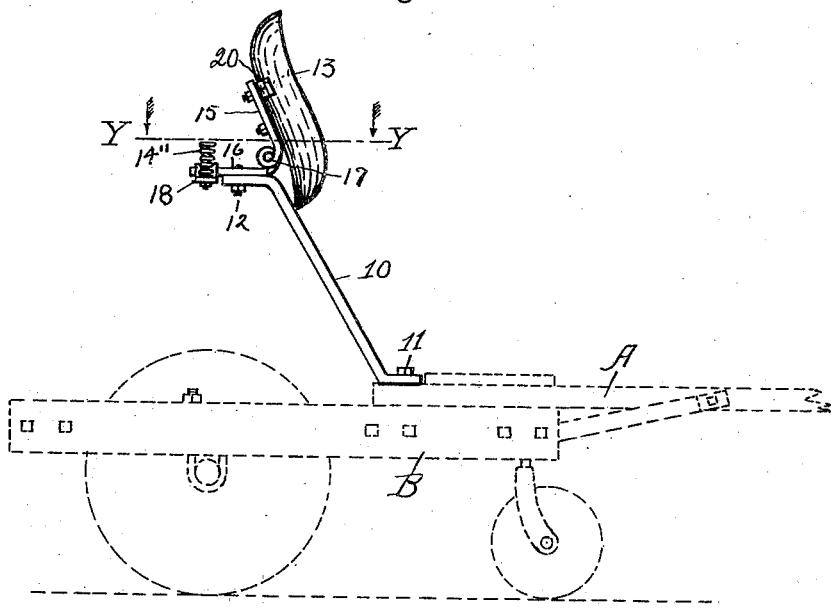
Figure 3:
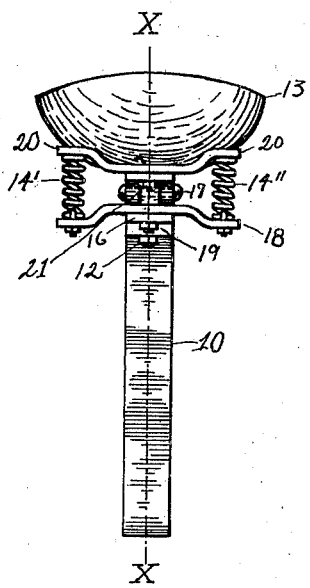
Figure 4:
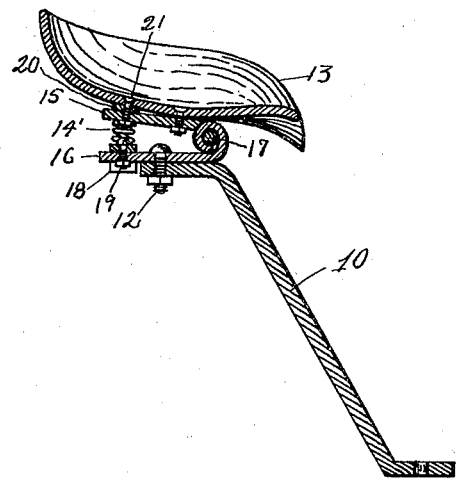
Figure 5:
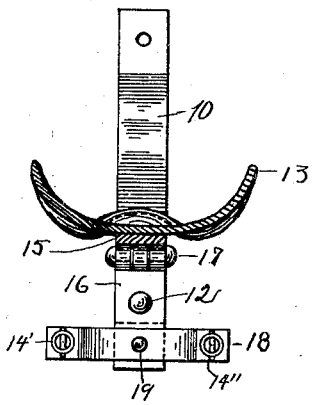

In the accompanying drawings, Figure 1 is a side elevation of my invention, showing same attached to an implement and its relative position in connection therewith. Fig. 2 is the same view as Fig. 1, with the exception the seat is turned in another position. Fig. 3 shows a rear elevation of my invention. Fig. 4 shows a central sectional elevation taken on the line X X of Fig. 3, and Fig. 5 shows a top plan view taken on line Y Y of Fig. 2.

Similar letters and figures of reference denote and refer to like parts throughout the several views.

A represents the tongue, and B the frame, of an ordinary agricultural implement. To one or the other of these parts I secure an angle supporting-post 10 by means of a bolt 11, passing through a hole in the lower horizontal portion of 10 and then through in this instance the inner end of the tongue A, substantially as shown in the drawings. The post 10 has its upper end bent rearward, forming an upper horizontal portion through which is a hole for the reception of the bolt 12. Lying on and in contact with the upper face of the upper horizontal portion of 10 is the member 16, which is securely contacted with the upper horizontal surface of 10 by the bolt 12. The forward or right-hand portion of 16 has a notch cut out of each corner, the width of each notch being equal to one-third of the width of the member 16. These notches extend rearward far enough to allow the central one-third of 16 to be bent upward, rearward, and downward until it contacts with the upper surface of 16, thus forming the male portion of a hinge, the female portion of said hinge being described otherwhere herein. The rear portion of 16 extends to the rear beyond the end of 10, where it provides a support for the center of the cross-bar 18 and is secured thereto by the bolt 19. Near each end of 18 are holes in which are secured the two upwardly-extending coil-springs 14' and 14''. These springs are at all times held secure and perpendicular by means of bolts passing through holes near the ends of 18 and clamping the lower ends of the springs 14' and 14''.

15 represents a member of substantially the same size and shape as the member 16 except that its forward end is formed into the female portion of a hinge, which is accomplished by cutting out the central one-third for a distance back sufficient to allow of the two outer one-third portions to be turned downward, rearward, and upward to form the female portion of the hinge. The curved forward portion of 16 can now be placed between the two forward portions of 15, and a bolt 17 can then be passed through the hole formed by the bent portions of both 15 and 16, which will complete the hinge and allow the rear end of 15 to be moved upward and forward with 17 as a pivot.

13 represents the seat proper, and this is secured to the upper surface of the member 15 by a bolt passing through central portion of 13 and then through the member 15, as shown. 20 represents a cross-bar secured to the rear end of 15 by a bolt 21, which bolt may extend up through the bottom of the seat 13, and thus assist in more securely holding the seat in proper position. The bar 20 is of substantially the same size and shape as the bar 18, which it is directly above. Then the seat is in the position shown in Figs. 1, 3, and 4. The outer lower faces of the ends of 20 are adapted to receive the upper ends of the coil-springs 14' and 14", but are not securely attached thereto.

Operation: It can now be seen that the seat 13 will be provided with spring-supports when in the position shown in Figs. 1, 3, and 4 and that the seat can be turned forward to the position shown in Figs. 2 and 5, the seat proper can be removed from the tool by removing the bolt 17, and that the entire mechanism may be removed from the tool by removing the bolt 11.

My invention is perfectly adapted to accomplish the purposes for which it is intended, and it is evident that changes in and modifications of the specific construction herein shown and described may be made and that analogous parts may be used to accomplish the same results without departing from the spirit of my invention or sacrificing any of its many advantages, and the specific construction of the details of my invention in which novel features are embodied may be variously changed without altering the essential principles which are claimed as new.

The terms "forward," "rear," "up," and "down" and other similar terms are used for convenience of description, and it is not intended by their use to limit the arrangement of the parts to the relative positions indicated.

Having now fully shown and described my invention and the best mode for its construction to me known at this time, what I claim as new, and desire to secure by Letters Patent of the United States, is—

In an implement-seat, the combination of the angular supporting-post 10 secured at its lower end to an implement, of the hinge member 16 attached to the upper end of the post 10 by a bolt, of the member 15 hinged to the member 16 carrying on its rear end the cross-bar 20, of the seat 13 secured to the member 15 and the bar 20, of the cross-bar 18 secured to the rear end of the member 16 at right angles thereto and carrying the coil-springs 14' and 14" on its outer ends, all substantially as shown and described and for the purposes specified.

In testimony whereof I have hereunto set my name in the presence of two subscribing witnesses.

JOHN G. WANGERIN.

Witnesses:
A. WANGERIN,
C. S. PETERSEN.